B. C. SHIPMAN.
WAVE MOTOR.
APPLICATION FILED MAY 27, 1912.

1,057,287.

Patented Mar. 25, 1913.

5 SHEETS—SHEET 1.

WITNESSES
H. B. Clark
B. M. Freund

INVENTOR
B. C. Shipman
BY
Carlos P. Griffin
ATTORNEY

B. C. SHIPMAN.
WAVE MOTOR.
APPLICATION FILED MAY 27, 1912.

1,057,287.

Patented Mar. 25, 1913.

5 SHEETS—SHEET 3.

WITNESSES
H. B. Clark
B. M. Freund

INVENTOR
B. C. Shipman
BY
Carlos P. Griffin
ATTORNEY

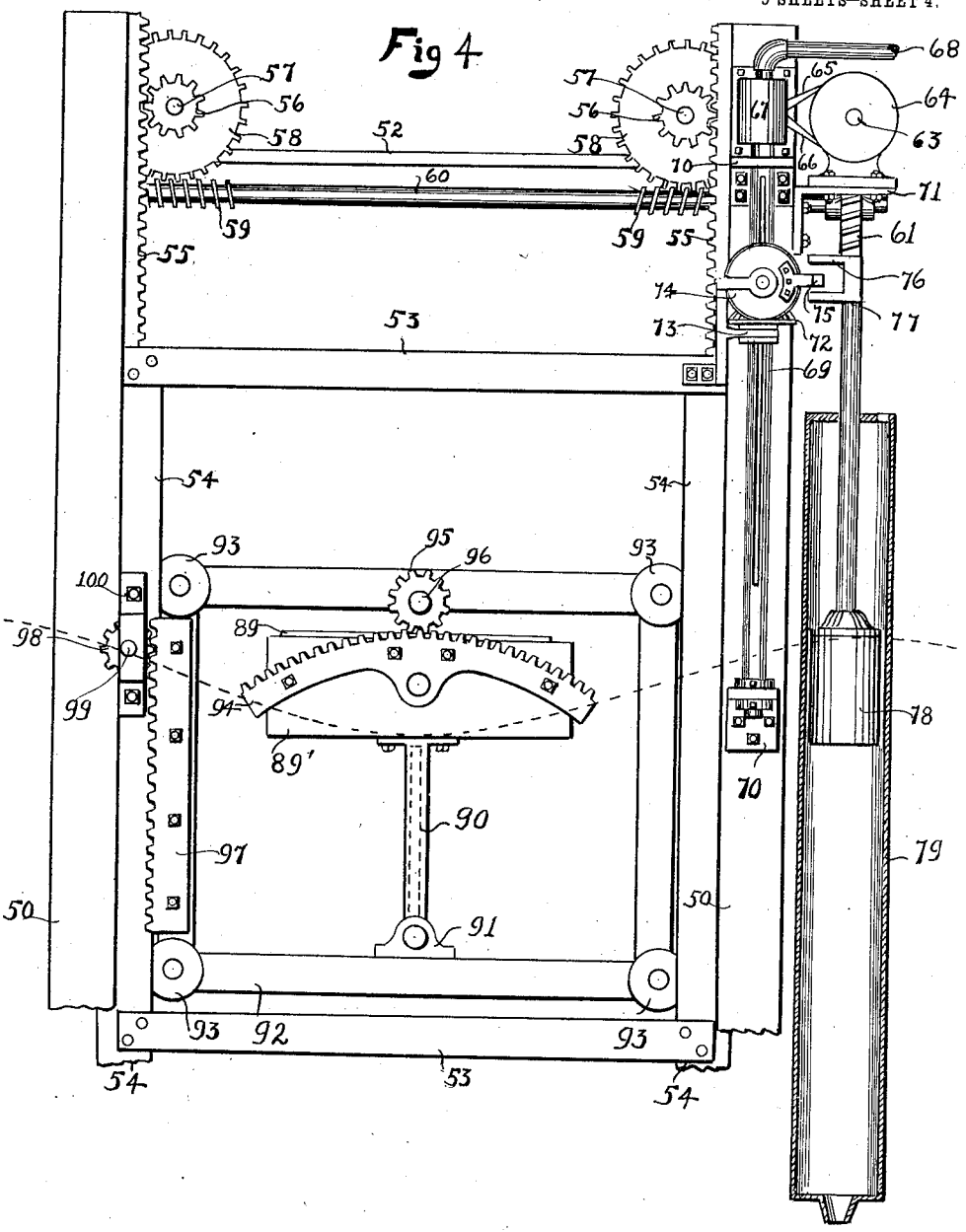

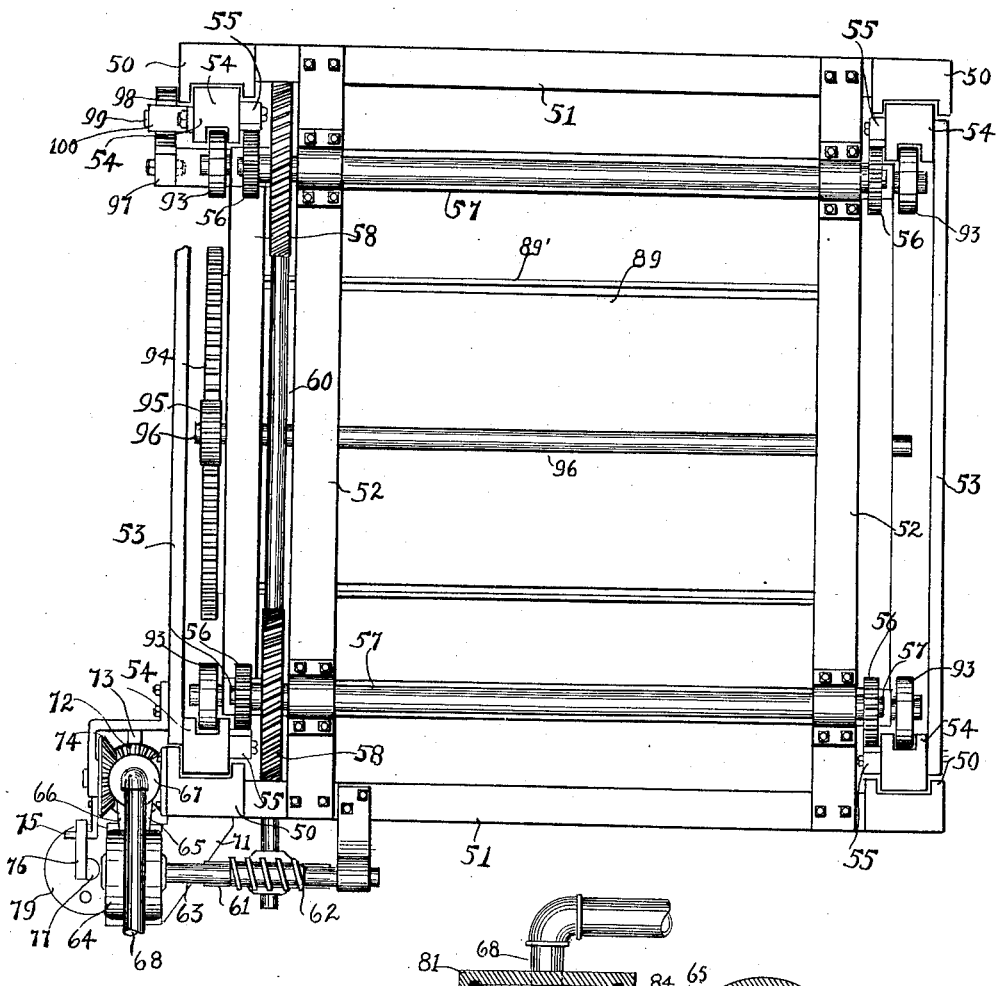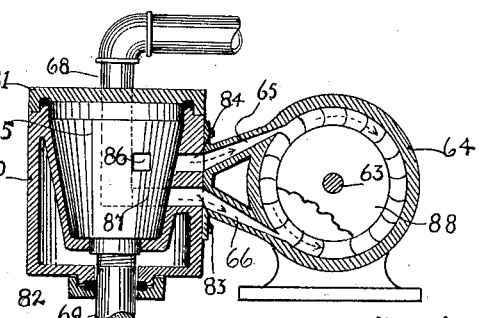

UNITED STATES PATENT OFFICE.

BENNET CARROLL SHIPMAN, OF SAN FRANCISCO, CALIFORNIA, ASSIGNOR TO PACIFIC WAVE POWER COMPANY, OF SAN FRANCISCO, CALIFORNIA, A CORPORATION OF CALIFORNIA.

WAVE-MOTOR.

1,057,287.      Specification of Letters Patent.      Patented Mar. 25, 1913.

Application filed May 27, 1912. Serial No. 700,083.

*To all whom it may concern:*

Be it known that I, BENNET C. SHIPMAN, citizen of the United States, residing at San Francisco, in the county of San Francisco and State of California, have invented a new and useful Wave-Motor, of which the following is a specification in such full and clear terms as will enable those skilled in the art to construct and use the same.

This invention relates to a wave motor, and its object is to provide a wave motor which shall apply the maximum power from waves to suitable driving mechanism, regardless of the wave height and at any stage of the tide.

Figure 1:
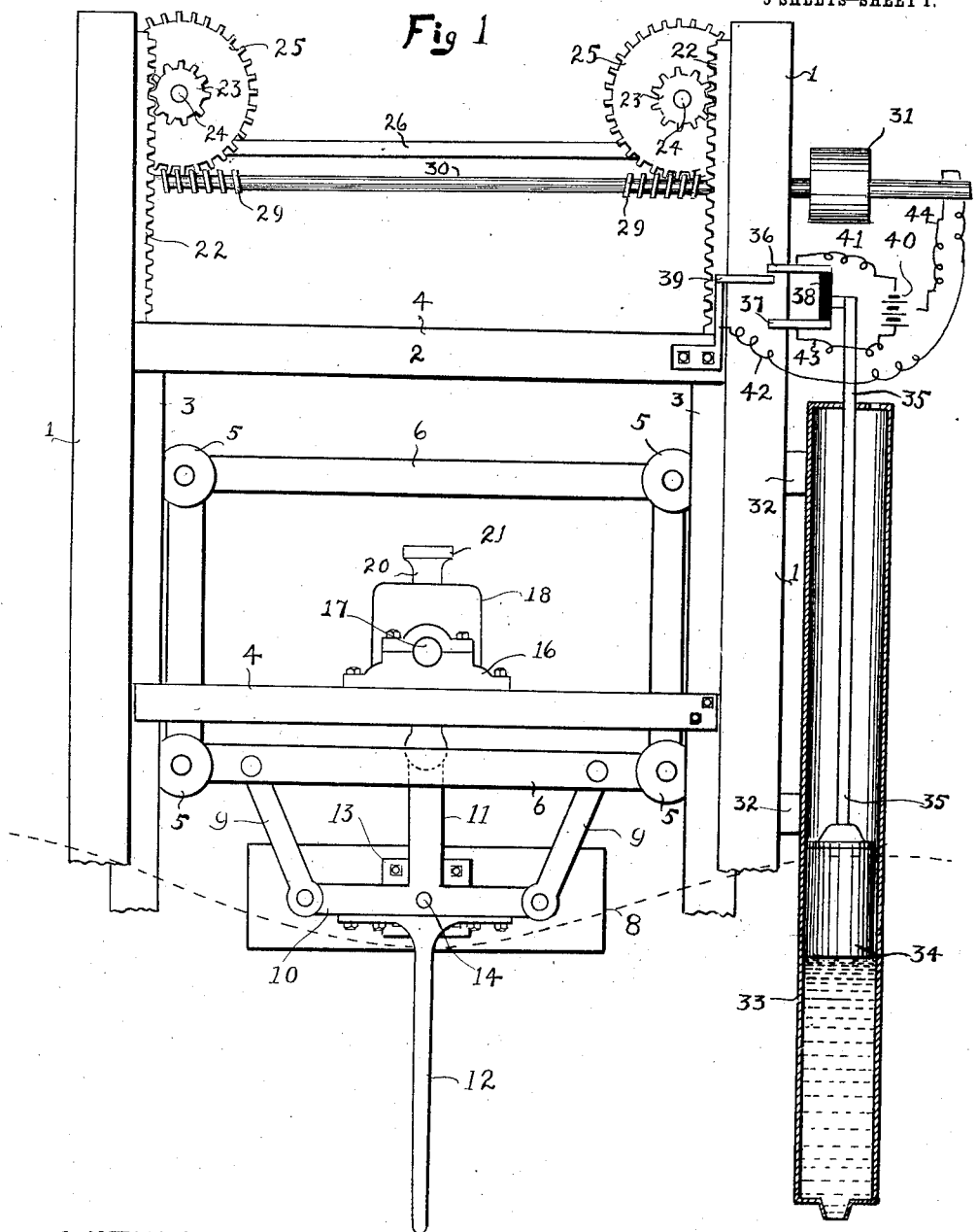
Figure 2:
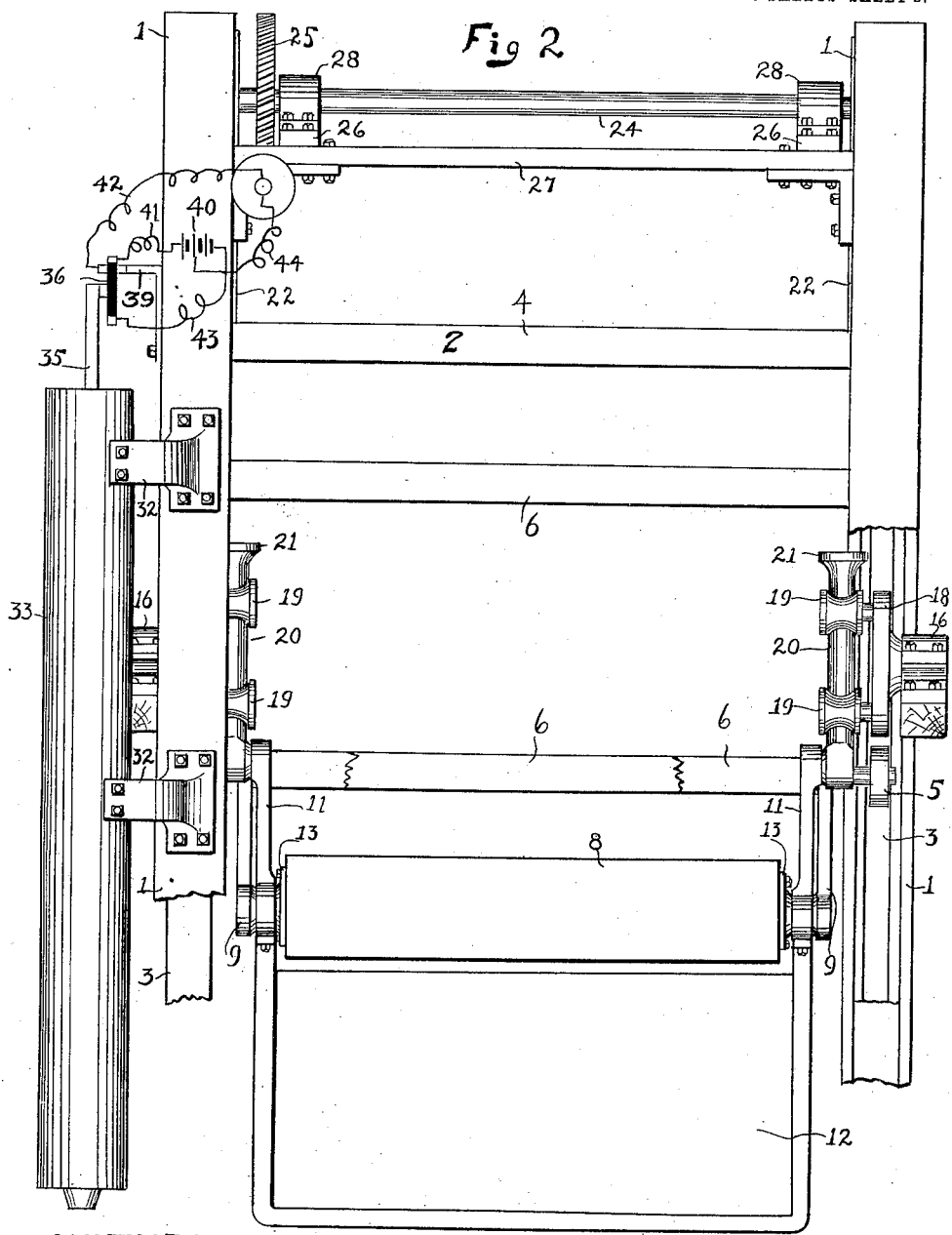
Figure 3:
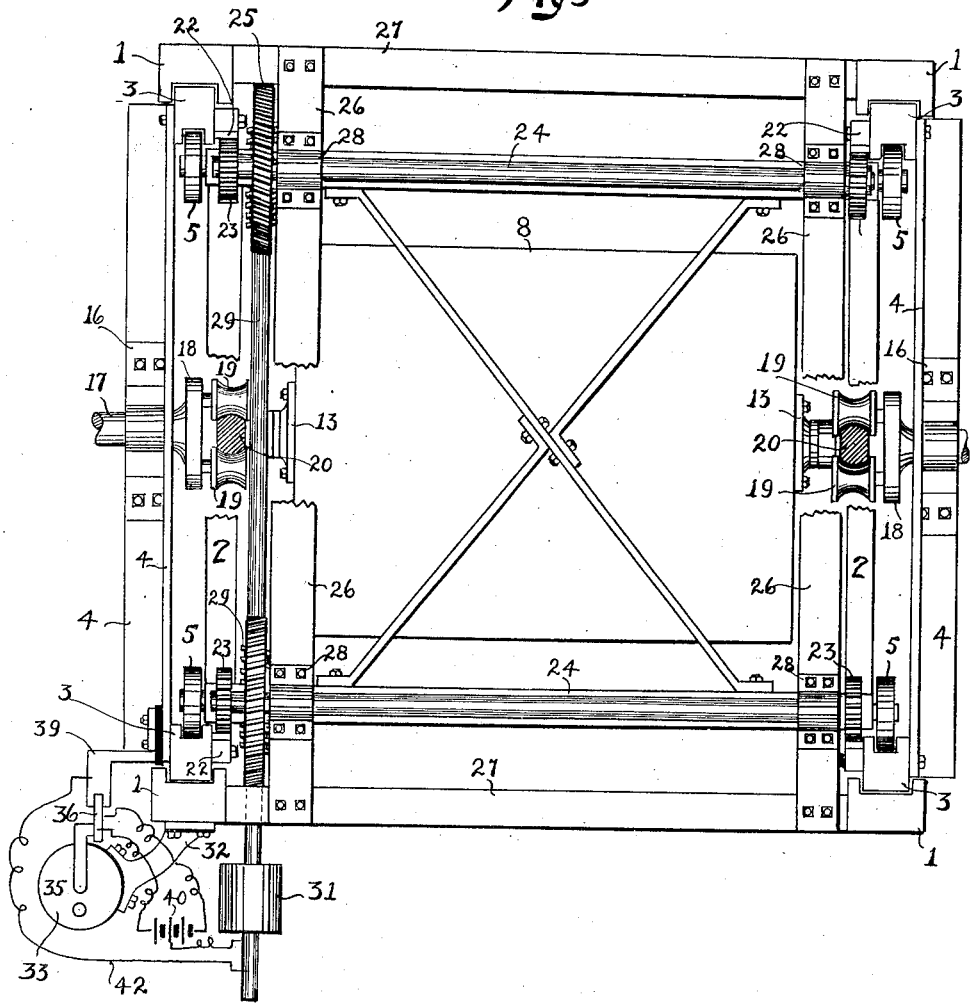

In the drawings in which the same numeral of reference is applied to the same portion throughout the several views, Figure 1 is an end elevation of the complete wave motor, showing an electrical control for the tide regulating frame, Fig. 2 is a side elevation of the motor and frame, in which the same is guided, Fig. 3 is a plan view of the motor, Fig. 4 is an end elevation partly in section of a slightly modified form of motor having a water motor for regulating the height of the tide frame, Fig. 5 is a plan view of the modified form of the invention, and Fig. 6 is a view partly in section of the water valve used for reversing the wave motor.

The numeral 1 represents a series of four fixed piles which support a guide frame 2, said frame being movable vertically in guides on the piles 1. The guide frame 2 comprises four vertical members 3, each member lying in a guide in one of the piles 1. These vertical members are suitably connected together by means of cross ties 4 and each one is provided with a guide for wheels 5, which are secured to a secondary frame 6, there being eight of said wheels 5, four at the top and four at the bottom of said frame.

The frame 6 is supported from the float 8 by means of links 9, said links being pivoted to the frame and to a cross bar in such a manner as to cause said cross bar to move with its center of motion at some point below the same. The cross bar 10 to which the links are pivoted has an upwardly extending portion 11 and has a vane 12 bolted thereto, the latter extending below the cross bar such a distance as is deemed necessary.

The float 8 has plates 13 at each end thereof, which plates have journals 14 bearing in the bar 10, so that as the waves rise and fall the float will always remain tangent thereto without unduly straining the apparatus.

Each cross bar 4 is provided with a suitable journal bearing 16, in each of which is journaled a shaft 17, said shaft having a boss 18 thereon which carries four grooved rollers 19 said rollers being sufficiently heavy and strong to hold a slidable crank 20 which has a head 21 at one end to prevent its withdrawal from its position between the grooved rollers, and which is connected with the bar 11 at its other end.

The result of the above construction is that the motion of the float due to the passage of a sea wave will result in the rotation of the shafts 17, changes in the wave height being accommodated by the sliding movement of the slidable crank 20.

Since only in bodies of water which remain at substantially the same height at all times would the apparatus be operative, it becomes necessary to provide means whereby the frame supporting the shafts 17 may be shifted to accommodate the apparatus to all tides, and this is accomplished by providing each of the bars 3 with rack teeth 22, each of which is engaged with a suitable pinion 23, there being four of said rack bars and four of said pinions. The pinions 23 are carried by shafts 24, each of which is provided with a suitable worm gear 25. The shafts 24 are supported on cross bars 26 carried by cross bars 27 secured to the fixed piling 1, suitable journal boxes 28 forming the bearings for said shafts.

Each worm gear 25 has a worm 29 in mesh therewith, each of said worms being carried by a shaft 30 suitably geared to a motor 31. One of the fixed piles is provided with two brackets 32 which support a cylinder 33, said cylinder having a small opening in the bottom thereof and having a float 34 therein, said float having a rod 35, at the upper end of which are contact points 36 and 37, suitable insulation 38 securing said contact points to the rod 35.

One of the rack bars 22 has an arm 39 bolted thereto, which is placed between the two contact points 36 and 37. A suitable source of electric power, as the batteries 40, is placed adjacent the apparatus, and wires 41, 42, 43 and 44 connect the motor and batteries in such a manner as to reverse the direction of rotation of the motor when the contact of the bar 39 shifts from the contact point 36 to the contact point 37, as it will when there is a sufficient variation of the tide, the tide slowly filling the cylinder 33 and slowly emptying the same when it falls.

While the above form of the invention shows an electrical control for regulating the heights of the guide frames, it will be obvious that there may be other means employed for accomplishing this same purpose, and it will also be obvious that there may be other means for transmitting the power from the wave motor than the one shown in the figures. Such modifications are shown in Figs. 4 to 6, in which the piling is shown at 50, said piling having suitable guides and being connected by means of girders 51, said girders 51 having cross girders 52 connected therewith to support the parts of the apparatus which lift the guide frame 53.

The guide frame comprises four vertical bars 54 which are suitably connected together to carry the strains of the apparatus. Each of the bars 54 is provided with a rack bar 55, each of said rack bars being in mesh with and carried by a pinion 56 or two shafts 57 there being four of the pinions 56 or two of said shafts 57. Each shaft 57 carries a worm gear 58, each gear being in mesh with worms 59 on a shaft 60. This shaft 60 carries in turn a worm gear 61, which is in mesh with a worm 62 on a shaft 63 of the water motor 64. The result of this construction is that a very small amount of power applied to the shaft 63 will raise and lower the frame 53, and its attachments and the motor may be operated in either direction by turning the water through either the nozzle 65 or in the reverse direction by turning it through the nozzle 66, a valve head 85 changing the direction of flow of the water as may be desired, as indicated by dotted arrows in Fig. 6.

The valve 85 receives its power of water from the pipe 68 and is rotated by means of a shaft 69, said shaft being supported in brackets 70 on one of the piles 50. The water motor 64 is supported upon a bracket 71 also located upon one of the piles 50. The shaft 69 is rotated by means of a gear 72 slidable vertically thereon, a bracket 73 supporting said gear in a fixed position with respect to a gear 74, the latter also being carried by bracket 73.

The gear 74 has an arm 75 secured thereto, which arm extends between the arms of a fork 76 on the rod 77. This rod 77 is supported by means of a float 78 in a cylinder 79, the cylinder having a small hole at the bottom thereof to permit the escape of water therefrom while at the same time it will not escape rapidly enough to cause the rod 77 to move with oscillations of the waves. Should the tide rise, the rod 77 will rise and the gear 74 will be rotated, whereupon water will be forced from the pipe 68 through the motor 64 in one direction, the reverse operation occurring when the tide falls. The reversing valve comprises a casing 80 having a cover threaded therein at 81 and with which the pipe 68 is connected. This valve has a suitable packing box 82 and ports 83 and 84, and the rotatable ported head 85 is secured to the shaft 69. This head 85 has ports 86 and 87 and when rotated in the proper directions will cause water to pass through the pipes 66 or 65 as desired, the water therefrom discharging against the wheel 88 to rotate the shaft 63 in the desired direction.

The wave motor proper comprises the float 89 which is pivoted in the frame 89', which latter is secured by means of bars 90 to journal boxes 91 at the bottom of the rectangular frame 92, said frame having eight rollers 93 which move in guides in the posts 54. There are two of the bars 90 and they are suitably connected by a vane similar to the vane 12. The float is pivoted to a frame 89' which has a curved rack bar 94 thereon, which meshes with a pinion 95 on the shaft 96, power being taken from said shaft in any suitable manner. Since this shaft will receive only a portion of the power developed by the waves in moving the float 89, a rack bar 97 is secured to the frame 92, which rack bar is in mesh with a pinion 98 on a shaft 99, a bracket 100 forming the bearing for the shaft 99. Each of the shafts 96 and 99 will rotate first in one direction and then in another, but any suitable apparatus may be connected therewith for the transmission of the power, thus obtained, which is not affected by this oscillatory motion.

Having thus described my invention what I claim as new and desire to secure by Letters Patent of the United States is as follows:

1. In a wave motor, a fixed frame work, a slidable frame therein, means to move said slidable frame to keep it in a determinate position with respect to a variable tide, a float, a slidable frame in the first mentioned frame, and means to transmit power from said float upon its movement by the waves, as set forth.

2. In a wave motor, a fixed frame work, a slidable frame therein, means to move said slidable frame to a determinate position with respect to a variable tide, a second slidable frame movable in the first slidable frame, a float, means connecting the second slidable frame and the float whereby the float will move about a center below the surface of the water, a vane extending downwardly from the float toward the center of motion thereof, and means to transmit power from the float upon its movement by the waves, as set forth.

3. In a wave motor, a fixed frame work, a slidable frame therein, a motor to raise and lower said slidable frame, means to cause said motor to raise or lower said frame to keep the same at a determinate position with respect to a variable tide, a second slidable frame within the first slidable frame, a float, means to cause said float to move about a center below the surface of the water, supports connecting said float and said second slidable frame, and means to transmit power from said float upon its movement by the waves, as set forth.

4. In a wave motor, a fixed frame work, a slidable frame therein, means to move said slidable frame to a determinate position with respect to a variable tide, a second slidable frame movable in the first slidable frame, a float, means connecting the second slidable frame and float, whereby the float will move about a center below the surface of the water, and means connected with said float to rotate a shaft upon the first slidable frame, as set forth.

5. In a wave motor, a fixed frame work, a slidable frame therein, means to move said slidable frame to a determinate position with respect to a variable tide, a second slidable frame movable in the first slidable frame, a float, means to support said second slidable frame from the float, and means to transmit power from said float upon its movement by the waves, as set forth.

6. In a wave motor, a fixed frame work, a slidable frame therein, a motor to raise and lower said slidable frame, a chamber having a small opening therein for permitting the ebb and flow of the tide therethrough, a float in said chamber, and means connected with said float for starting the motor in either direction, as set forth.

7. In a wave motor, a fixed frame work, a slidable frame therein, a motor to raise and lower said slidable frame, means to cause said motor to raise or lower said frame so that it will always be at a determinate position with respect to a variable tide, a float for setting said motor in motion in either direction, a second slidable frame within the first mentioned slidable frame, a float supporting said second slidable frame, and means to cause said float to rotate a shaft fixed upon one of said frames, as set forth.

8. In a wave motor, a guide frame, a float supporting said guide frame, a main shaft, and a crank of variable effective length connected with said shaft and said float to rotate the shaft, substantially as described.

9. In a wave motor, a guide frame, a float supporting said guide frame, means to cause said float to move about a center below the same, a main shaft, and a crank of variable effective length connected with said shaft and said float to rotate the shaft, substantially as described.

10. In a wave motor, a guide frame, a float supporting said guide frame, a vane below the float, a main shaft, a crank of variable effective length connected with said shaft and said float to rotate the shaft, substantially as described.

11. In a wave motor, a guide frame, a float supporting said guide frame, means to cause the center of movement of said float to lie below the float, a vane extending below the float toward the center of movement thereof, and a crank of variable effective length connected with the main shaft and the float to rotate said shaft, substantially as described.

12. In a wave motor, guides, a guide frame slidable therein, a float supporting said guide frame, means to cause the center of movement of said float to lie below the same, a vane extending below the float toward the center of movement thereof, a main shaft, a head carried thereby, and a crank arm freely slidable in said head for rotating said shaft, substantially as described.

13. In a wave motor, guides, a guide frame slidable therein, a float supporting said guide frame, means to cause the center of movement of said float to lie below the same, a vane extending below the float toward the center of movement thereof, a main shaft, a head carried thereby, a crank freely slidable transversely of said head, and an arm extending upwardly from the float and connected with the crank to rotate said shaft, substantially as described.

14. In a wave motor, guides, a guide frame vertically slidable therein, a float supporting said guide frame, means connecting the guide frame and float to cause the center of movement of the float to lie below the same, pivots to permit the float to accommodate itself to various positions on the surface of the water, a vane extending below the float toward the center of movement thereof, a shaft, and a crank of variable effective length connected with the shaft and float to rotate said shaft, substantially as described.

In testimony whereof I have hereunto set my hand this 13th day of May A. D. 1911, in the presence of the two subscribed witnesses.

BENNET CARROLL SHIPMAN.

Witnesses:
C. P. GRIFFIN,
L. H. ANDERSON.